(12) United States Patent
Morimoto et al.

(10) Patent No.: US 6,574,986 B2
(45) Date of Patent: Jun. 10, 2003

(54) OIL SEPARATOR AND OUTDOOR UNIT WITH THE OIL SEPARATOR

(75) Inventors: Osamu Morimoto, Tokyo (JP); Tomohiko Kasai, Tokyo (JP); Hirofumi Koge, Tokyo (JP); Hiroki Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/088,519

(22) PCT Filed: Aug. 7, 2001

(86) PCT No.: PCT/JP01/06771
§ 371 (c)(1),
(2), (4) Date: Mar. 29, 2002

(87) PCT Pub. No.: WO02/16840
PCT Pub. Date: Feb. 28, 2002

(65) Prior Publication Data
US 2002/0134102 A1 Sep. 26, 2002

(30) Foreign Application Priority Data
Aug. 21, 2000 (JP) ............................................ 2000-49903

(51) Int. Cl.⁷ .............................................. F25B 43/02
(52) U.S. Cl. ........................................ 62/470; 55/459.1
(58) Field of Search .................... 62/470, 471; 55/459.1

(56) References Cited

U.S. PATENT DOCUMENTS

| | | | | |
|---|---|---|---|---|
| 5,369,958 | A | * | 12/1994 | Kasai et al. .................. 62/158 |
| 5,970,772 | A | * | 10/1999 | Yoshizawa et al. ........... 72/250 |
| 6,024,547 | A | * | 2/2000 | Nagae .......................... 417/62 |

FOREIGN PATENT DOCUMENTS

| | | | | |
|---|---|---|---|---|
| JP | 09-177529 | | 7/1987 | |
| JP | 405180539 A | * | 7/1993 | .................. 62/470 |
| JP | 405296611 A | * | 11/1993 | .................. 62/470 |
| JP | 4405296610 A | * | 11/1993 | .................. 62/470 |
| JP | 5-329401 | | 12/1993 | |
| JP | 405340650 A | * | 12/1993 | .................. 62/470 |
| JP | 406018127 A | * | 1/1994 | .................. 62/470 |
| JP | 08-319815 | | 12/1996 | |
| JP | 11-63690 | | 3/1999 | |

* cited by examiner

Primary Examiner—Denise L. Esquivel
Assistant Examiner—Mohammad M. Ali
(74) Attorney, Agent, or Firm—Oblon, Spivak, McClelland, Maier & Neustadt, P.C.

(57) ABSTRACT

An oil separator including a shell (50) with a cylindrical section and a taper section which narrows in a downward direction and which is formed as an integral part at the bottom of the cylindrical section, an outlet pipe (51) which is inserted through the top of the shell so that the central axis of the outlet pipe coincides with the central axis of the shell, a discharge pipe (52) connected to an opening provided at the bottom of the taper section, and an inlet pipe (53) connected tangentially to the inner surface of the cylindrical section for introducing a gas liquid two phase flow into the shell, wherein the distance between the shell opening (50a) and the tip (51a) of the outlet pipe inside the shell is at least 5 times the inside diameter of the inlet pipe (53).

14 Claims, 10 Drawing Sheets

OIL SEPARATOR AND OUTDOOR UNIT WITH THE OIL SEPARATOR

TECHNICAL FIELD

The present invention relates to an oil separator used primarily in refrigerating devices and air conditioning devices for separating oil, which is carried out from the compressor along with a refrigerant gas, from the refrigerant gas and then returning this oil to the compressor, and also relates to an outdoor apparatus using such an oil separator.

BACKGROUND ART

Figure 14:
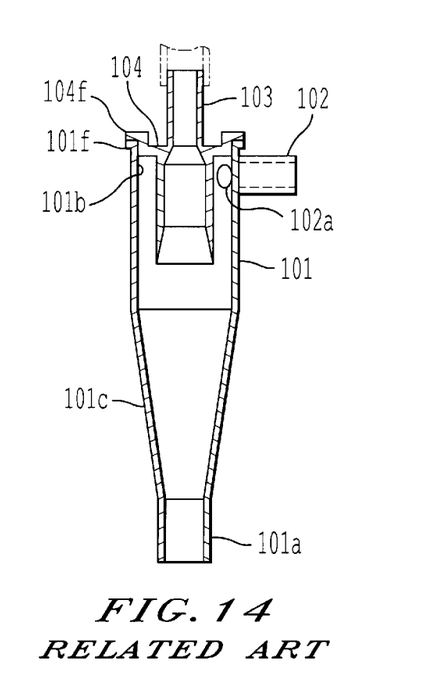
FIG. 14 is an internal structural diagram of a conventional oil separator.

FIG. 14 is an internal structural diagram of a conventional oil separator disclosed in Japanese Patent Laid-Open Publication No. Hei 8-319815.

In FIG. 14, 101 represents a shell of a substantially cylindrical shape, wherein one of open ends 101a is of a small diameter, and the other open end 101b is of a large diameter. A taper section 101c is formed at the open end 101a, and a flange section 101f which extends out in radial direction is formed at the other open end 101b. Furthermore at the open end 101b, an inlet pipe 102 is formed as an integral part of the shell 101, and an inlet port 102a is formed in the shell 101 in a tangential direction to the inner cylindrical surface of the shell 101.

103 represents an outlet pipe of a cylindrical shape with a collar section 104 formed around the middle section of the pipe, and this collar section 104 has a flange section 104f which is stuck onto the flange section 101f of the shell 101.

In this type of oil separator, a gas liquid mixture of gas and oil mist flows in from the inlet pipe 102 in a tangential direction to the inner surface of the shell 101 and circles around inside the shell 101, and centrifugal force causes the oil mist to separate and adhere to the inner surface of the shell 101, and then flow down along the inner surface and discharge from the open end 101a. Furthermore, the gas which remains after the oil mist has separated is discharged from the outlet pipe 103. Because an internal opening of the outlet pipe 103 inside the shell is larger than an external opening, the speed of the gas inside the shell 101 is reduced when being drawn into the outlet pipe 103, so that oil mist adhering to the outside wall of the outlet pipe 103 is prevented from being carried on the gas current and caught in the outlet pipe 103.

Figure 15:
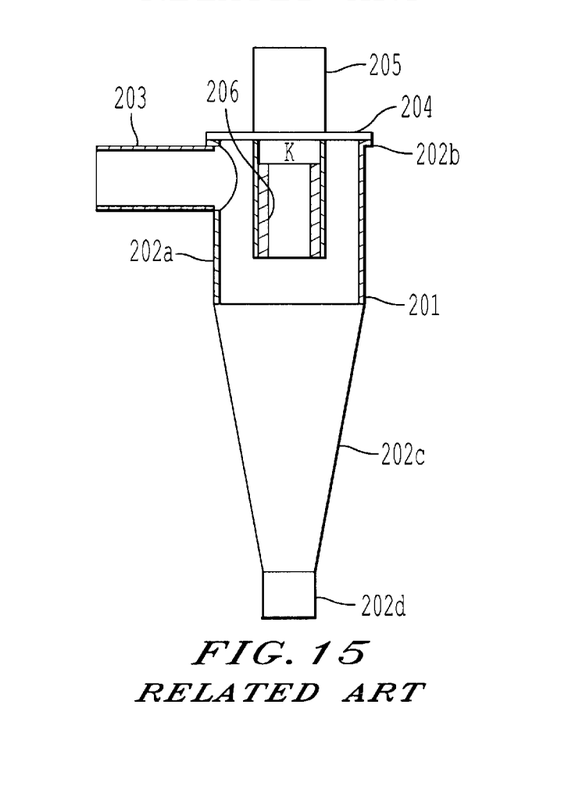
FIG. 15 is a partial longitudinal sectional view of a conventional oil separator.

FIG. 15 is a partial longitudinal sectional view of a conventional oil separator disclosed in Japanese Patent Laid-Open Publication No. Hei 9-177529.

In FIG. 15, 201 represents a shell, which is provided with a cylindrical section 202a with an integrated flange section 202b extending outward at its top end. Furthermore, an inverted cone shaped cylinder 202c is integrally attached to the bottom edge of the cylindrical section 202a, and an oil recovery section 202d is integrally attached to the bottom opening of the inverted cone shaped cylinder 202c. In addition, an inlet pipe 203 is attached to an opening near the top end of the cylindrical section 202a. A circular lid 204 is fixed to the flange section 202b of the cylindrical section 202a. An outlet pipe 205 passes through the center of the lid 204. A non-woven fabric 206 of a predetermined shape is attached to the inside of the outlet pipe 205.

In this type of oil separator, gas incorporating oil mist flows from the inlet pipe 203 into the shell 201, and circles around within the cylindrical space formed between the cylindrical section 202a and the outlet pipe 205 extending into the cylindrical section 202a. As a result of the cyclone effect resulting from the circling gas, the oil mist in the gas, particularly with a particle diameter of 5 μm or greater, collides with the inner surface of the shell 201 and condenses, and when a particle grows to a sufficiently large diameter on the inner surface, gravity causes the particle to slide down the inner surface and flow into the oil recovery section 202d.

Furthermore, the oil mist of a smaller particle diameter, which has not separated out through collision with the inner surface of the shell 201, flows into the outlet pipe 205 together with the gas. Due to the effect of the circling motion inside the cylindrical space K, the gas does not pass straight through the outlet pipe 205, but rather moves upwards in a helical type circling motion. At this point, the velocity distribution of the gas stream is such that the velocity close to the pipe wall is large, whereas the velocity in the center is extremely small. The gas which is circling at high speed in a helical type motion around the periphery hits the non-woven fabric 206 attached to the pipe wall and is adsorbed. Repeated adsorption of these minute particles leads to an increase in the diameter of the particles adsorbed to the non-woven fabric 206, and particles which have grown sufficiently large move down the non-woven fabric 206 under the influence of gravity, drop off the bottom edge of the outlet pipe 205, and are collected in the oil recovery section 202d.

Figure 16:
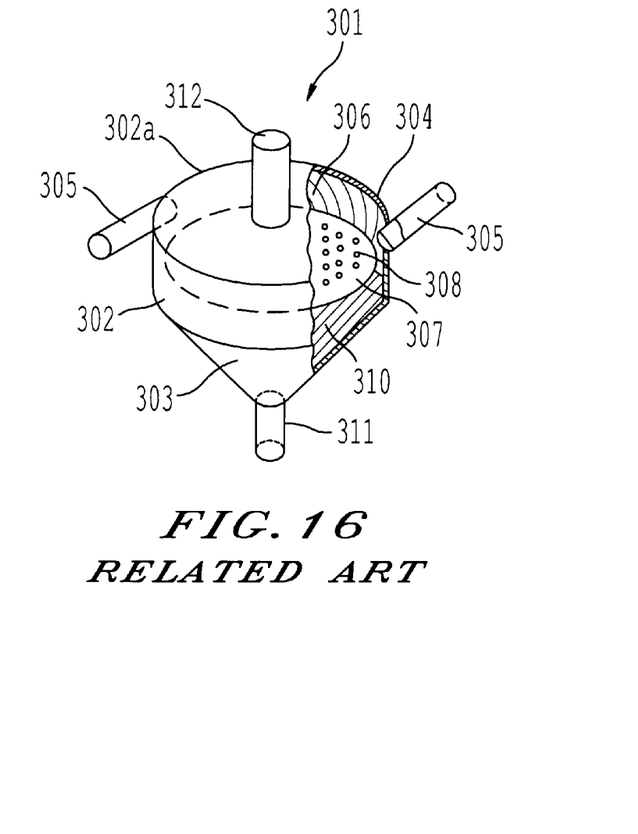
FIG. 16 is a structural diagram of a conventional oil separator.
Figure 17:
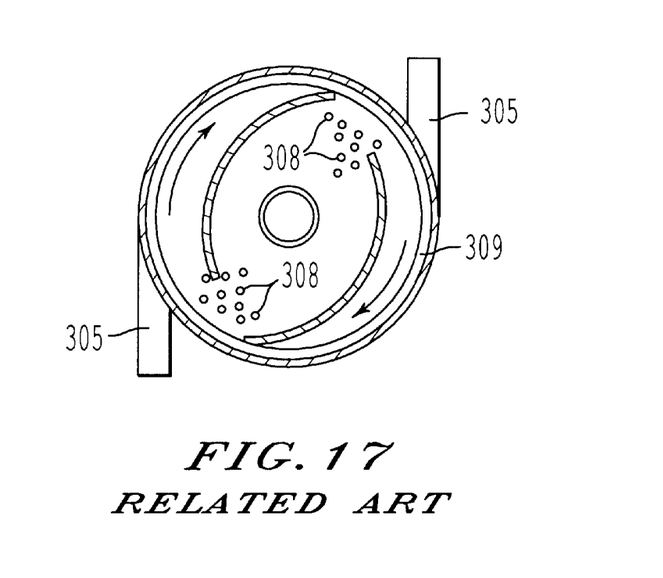
FIG. 17 is a top cross-sectional view of a conventional gas-liquid separator.

FIG. 16 is a structural diagram showing a conventional gas liquid separator disclosed in Japanese Utility Model Laid-Open Publication No. Hei 6-60402, and FIG. 17 is a cross-sectional diagram viewed from above.

In the diagrams, a gas-liquid separator 301 includes a shell 304 formed of a combination of a cylinder 302 and a cone 303. Inlet pipes 305 for introducing a two phase flow in a tangential direction are provided on the side of the cylinder 302 of the shell 304, and this two phase flow is separated into a liquid and a vapor by the centrifugal force produced by the two phase flow circling around inside the shell 304, so that the liquid adheres to the inside wall of the shell 304 through self adhesion.

A wick is also provided on the internal wall of the shell 304 for guiding the separated liquid into the cone 303. This wick is provided with a plurality of narrow grooves 306 of 0.3 to 0.5 mm formed in a helical pattern, and the force of the circling flow and the capillary phenomenon causes the liquid to move smoothly to the cone.

In addition, in order to prevent diffusion of the two phase flow from the cylinder 302 to the cone 303, a diaphragm 307 is provided inside the shell 304 to partition the shell into two portions on the sides of the cylinder 302 and the cone 303. The diaphragm 307 is provided with small apertures 308 for connecting the cylinder 302 side with the cone 303 side to maintain a uniform pressure within the shell 304. Furthermore, a gap 309 is provided between the outer perimeter of the diaphragm 307 and the inner surface of the shell 304. A wire gauze folded in a wave like pattern is put as a coarse wick, inside the cone 303 side of the shell 304 partitioned by the diaphragm 307, and functions as a liquid collector 310 for accumulating liquid. A liquid guide pipe 311 for guiding liquid out of the shell 304 is formed at the apex of the cone 303. Furthermore, an outlet pipe 312 is formed in the center of the cylinder 302 side of the shell 304 partitioned by the diaphragm 307, so as to pass through the end plate 302a of the cylinder 302 side.

In this type of conventional oil separator and gas liquid separator, the ideal positional relationship between the outlet pipe and the inlet pipes is unclear. Therefore, in systems in which the flow rate of the refrigerant varies in accordance with high pressure and low pressure fluctuations in the refrigerating cycle caused during load fluctuations, or in systems in which the compressor controls the capacity in accordance with the load, the system is unable to deal appropriately with such a problem that though the system operates appropriately at the time when the refrigerant flow rate is large, the velocity of the circling gas inside the oil separator falls and the oil separation efficiency resulting from the cyclone effect declines at the time when the refrigerant flow rate falls. Here, the oil separation efficiency is the ratio of the volume of oil discharged from the discharge pipe per a unit of time, relative to the volume of oil flowing into the oil separator per the unit of time.

If such a configuration is adopted that the diameter of the inlet pipe is reduced at the time of low flow rate in order to alleviate this problem, the pressure loss will increase at the time when the gas velocity flowing into the shell is increased, so that the efficiency of the refrigerating cycle will decline.

Furthermore, in the case where the separated oil cannot be suitably discharged from the oil separator, the volume of oil accumulated inside the shell increases, and the accumulated oil inside the oil separator is lifted up by the gas flow inside the oil separator and flows out of the outlet pipe, producing a problem of a reduction in the oil separation efficiency.

In addition, if a diaphragm is provided as shown in FIG. 16, or an adsorbent material such as a non-woven fabric for trapping oil mist is provided in the outlet pipe as shown in FIG. 15, in order to prevent the lifting of oil within the shell, the problem of increased cost associated with the increase in the number of components arises.

DISCLOSURE OF THE INVENTION

The present invention aims to solve the problems described above, and an object thereof is to provide an oil separator in which fluctuations in the pressure loss and the oil separation efficiency are small even in cases where the velocity of the gas flowing into the oil separator varies or the amount of oil accumulated inside the shell varies due to a variation in the flow rate of oil into the oil separator, and moreover in which the product cost is low.

An oil separator according to the present invention is an oil separator comprising a shell having a cylindrical section and a taper section which narrows in a downward direction and which is formed as an integral part at the bottom of the aforementioned cylindrical section, an outlet pipe which is inserted through the top of the aforementioned shell so that the central axis of the outlet pipe coincides with the central axis of the shell, a discharge pipe connected to an opening provided at the bottom of the aforementioned taper section, and an inlet pipe connected tangentially to the inner surface of the aforementioned cylindrical section for introducing a gas liquid two phase flow into the aforementioned shell, characterized in that the distance between the aforementioned opening and the tip of the outlet pipe inside the shell is at least 5 times the inside diameter of the aforementioned inlet pipe.

Furthermore, an oil separator according to the present invention is an oil separator comprising a shell having a cylindrical section and a taper section which narrows in a downward direction and which is formed as an integral part at the bottom of the aforementioned cylindrical section, an outlet pipe which is inserted through the top of the aforementioned shell so that the central axis of the outlet pipe coincides with the central axis of the shell, a discharge pipe connected to an opening provided at the bottom of the aforementioned taper section, and an inlet pipe connected tangentially to the inner surface of the aforementioned cylindrical section for introducing a gas liquid two phase flow into the aforementioned shell, characterized in that the tip of the outlet pipe inside the shell is positioned below the center of the inside diameter of the inlet pipe at a distance at least 5 times the inside diameter of the inlet pipe.

Furthermore, an oil separator according to the present invention is an oil separator comprising a shell having a cylindrical section and a taper section which narrows in a downward direction and which is formed as an integral part at the bottom of the aforementioned cylindrical section, an outlet pipe which is inserted through the top of the aforementioned shell so that the central axis of the outlet pipe coincides with the central axis of the shell, a discharge pipe connected to an opening provided at the bottom of the aforementioned taper section, and an inlet pipe connected tangentially to the inner surface of the aforementioned cylindrical section for introducing a gas liquid two phase flow into the aforementioned shell, characterized in that the aforementioned inlet pipe has a straight pipe section connected to the aforementioned cylindrical section, and the length of this straight pipe section is at least 8 times the inside diameter of the inlet pipe.

Furthermore, an oil separator according to the present invention is an oil separator comprising a shell having a cylindrical section and a taper section which narrows in a downward direction and which is formed as an integral part at the bottom of the aforementioned cylindrical section, an outlet pipe which is inserted through the top of the aforementioned shell so that the central axis of the outlet pipe coincides with the central axis of the shell, a discharge pipe connected to an opening provided at the bottom of the aforementioned taper section, and an inlet pipe connected tangentially to the inner surface of the aforementioned cylindrical section for introducing a gas liquid two phase flow into the aforementioned shell, characterized in that the aforementioned inlet pipe is a bent pipe having a first straight pipe section connected to the aforementioned cylindrical section and a second straight pipe section positioned at a 90 degree angle to the first straight pipe section in the direction of the aforementioned shell.

Furthermore, an oil separator according to the present invention is an oil separator comprising a shell having a cylindrical section and a taper section which narrows in a downward direction and which is formed as an integral part at the bottom of the aforementioned cylindrical section, an outlet pipe which is inserted through the top of the aforementioned shell so that the central axis of the outlet pipe coincides with the central axis of the shell, a discharge pipe connected to an opening provided at the bottom of the aforementioned taper section, and an inlet pipe connected tangentially to the inner surface of the aforementioned cylindrical section for introducing a gas liquid two phase flow into the aforementioned shell, characterized in that the aforementioned inlet pipe is a spiral shape centered around the central axis of the aforementioned shell.

Furthermore, in each of the above configurations, the aforementioned shell has a taper section which narrows in a upward direction and which is formed on the top of the aforementioned cylinder section as an integral part of the cylindrical section.

Furthermore, in each of the above configurations, a plurality of inlet pipes are provided, and these inlet pipes are connected to the aforementioned cylindrical section at the same vertical height position with an equal spacing between the pipes.

In addition, an outdoor apparatus according to the present invention is characterized by comprising a compressor, any one of the oil separators described above with an inlet pipe connected to the compressor, a capillary tube connected to a discharge pipe of the aforementioned oil separator, a valve connected to the discharge pipe in a parallel arrangement with the capillary tube, an oil return circuit connected to the capillary tube and the valve, an accumulator connected to the oil return circuit and the compressor, a four way valve connected to an outlet pipe of the aforementioned oil separator, and a heat exchanger connected to the four way valve.

Furthermore, an outdoor apparatus according to the present invention is characterized by comprising a plurality of compressors, the aforementioned oil separator with each inlet pipe connected to one of the plurality of compressors, a capillary tube connected to the discharge pipe of the aforementioned oil separator, a valve connected to the discharge pipe in a parallel arrangement with the capillary tube, an oil return circuit connected to the capillary tube and the valve, an accumulator connected to the oil return circuit and the aforementioned plurality of compressors, a four way valve connected to an outlet pipe of the aforementioned oil separator, and a heat exchanger connected to the four way valve.

In addition, in each of the outdoor apparatuses described above, the aforementioned valve is opened only during startup of the compressor.

BEST MODE FOR CARRYING OUT THE INVENTION

Embodiment 1.

Figure 1:
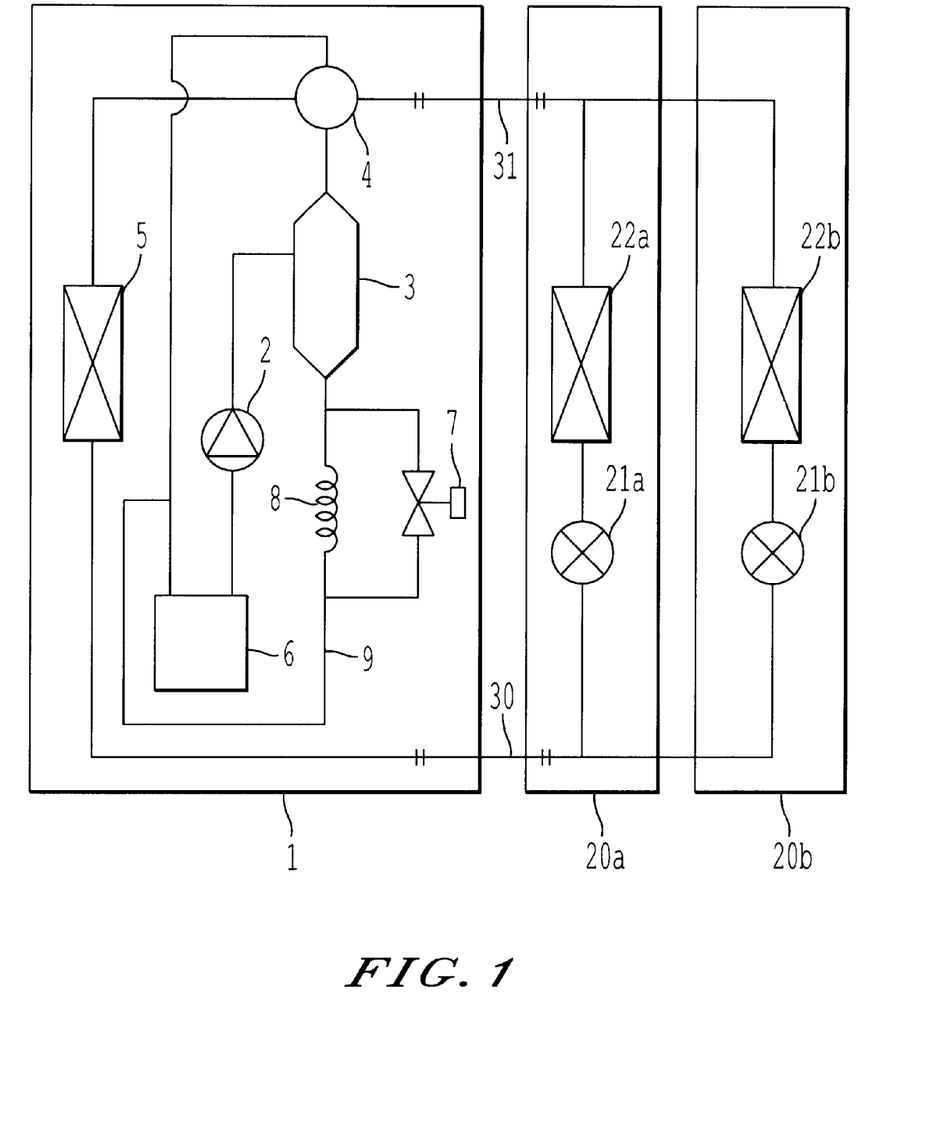
FIG. 1 is a refrigerant circuit diagram of a refrigerating cycle according to an Embodiment 1 of the present invention.

FIG. 1 is a refrigerant circuit diagram of a refrigerating cycle with an oil separator according to an Embodiment 1 of the present invention.

In FIG. 1, the refrigerating cycle comprises primarily a single outdoor apparatus 1, indoor apparatuses 20a, 20b, and a liquid pipe 30 and a gas pipe 31 connecting the outdoor apparatus 1 and the indoor apparatuses 20a, 20b.

Furthermore, the outdoor apparatus 1 comprises primarily a compressor 2, an oil separator 3 connected to the compressor 2, a four way valve 4 connected to the oil separator 3, a heat source side heat exchanger 5 with one port connected to the four way valve 4 and the other port connected to the liquid pipe 30, an accumulator 6 connected to the compressor 2, an electromagnetic valve 7 connected to the oil separator 3, a capillary tube 8 connected to the oil separator 3 in a parallel arrangement with the electromagnetic valve 7, and an oil return circuit 9 connected to the electromagnetic valve 7, the capillary tube 8 and the accumulator. The four way valve 4 is also connected to the gas pipe 31.

The indoor apparatus 20a comprises primarily a throttle device 21a connected to the liquid pipe 31, and a load side heat exchanger 22a with one port connected to the throttle device 21a and the other port connected to the gas pipe 30. In a similar manner, the indoor apparatus 20b comprises primarily a throttle device 21b and a load side heat exchanger 22b.

Next is a description of the operation of the refrigerating cycle of FIG. 1.

When the refrigerating cycle is started, there will be cases where liquid refrigerant is sitting in the compressor 2. In such a case, when the compressor 2 is activated, a phenomenon known as foaming occurs where the refrigerant liquid including the refrigerating machine oil inside the compressor 2 rapidly vaporizes and foams as a result of the pressure drop inside the compressor shell, so that large amounts of a mixed liquid incorporating both the refrigerant and the refrigerating machine oil flow from the compressor 2 into the oil separator 3. At this time, the electromagnetic valve 7 is opened and the mixed liquid of refrigerant liquid and oil is returned from the oil separator 3 to the inlet of the accumulator 7 via the oil return circuit 9. In this manner, even in the case where the inflow of oil into the oil separator 3 increases temporarily, any possibility of the oil separator 3 overflowing and oil being carried outside the outdoor apparatus system is prevented.

Furthermore, when the refrigerating cycle enters steady-state operation, the electromagnetic valve 7 is closed. Oil carried out of the compressor 2 along with the refrigerant gas is separated out by the oil separator 3, reduced to a low pressure by the capillary tube 8, and is subsequently returned to the compressor 2 via the oil return circuit 9 and the accumulator 6.

Next is a description of the structural details of the oil separator 3.

Figure 2:
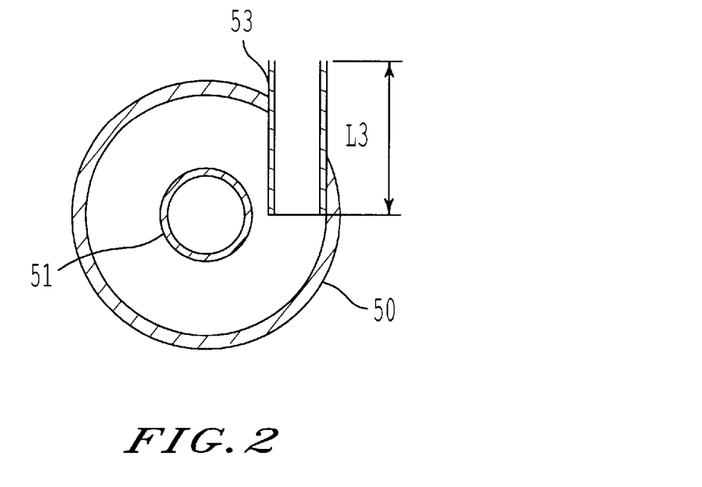
FIG. 2 is a top cross-sectional view of an oil separator according to the Embodiment 1 of the present invention.
Figure 3:
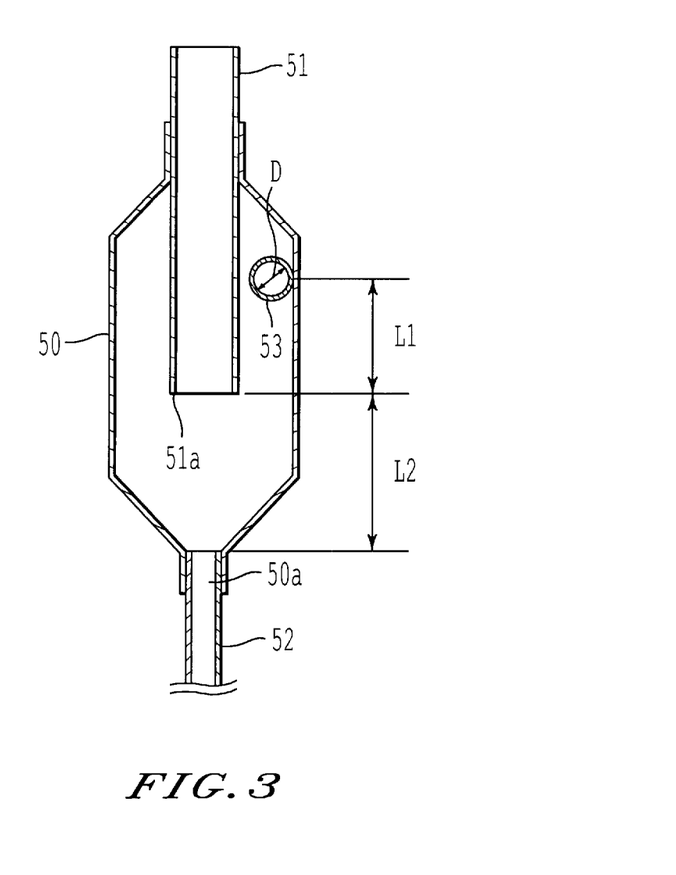
FIG. 3 is a side cross-sectional view of an oil separator according to the Embodiment 1 of the present invention.

FIG. 2 is a top cross-sectional view of the oil separator 3, and FIG. 3 is a side cross-sectional view of the oil separator 3.

In FIG. 2 and FIG. 3, 50 represents a shell of a cylindrical shape with both ends narrowed in tapered shape, and comprises a cylindrical section, a lower taper section beneath the cylindrical section, and an upper taper section above the cylindrical section. 51 represents a cylindrical outlet pipe, which is inserted into the inside of the shell 50 through the apex of the upper taper section of the shell 50, and this outlet pipe 51 is fixed so that the central axes of the outlet pipe 51 and the shell 50 coincide. 52 represents a discharge pipe, which is fixed to a lower opening 50a formed at the apex of the lower taper section of the shell 50. 53 represents an inlet pipe, which is a cylindrical shaped pipe with a diameter D which is connected in a tangential direction to the inner surface of the cylindrical section (the section which has not been narrowed in tapered shape) of the shell 50. The tip 51a of the portion of the outlet pipe 51 inserted inside the shell 50 is positioned a distance L1 below the center of the tip of the inlet pipe 53 inside the shell 50, and a distance L2 above the lower opening 50a of the shell 50.

Next is a description of the phenomena which occur in an oil separator of this type of construction.

A gas liquid two phase flow consisting of refrigerant gas and refrigerating machine oil discharged from the compressor 2 flows into the shell 50 from the inlet pipe 53. The gas liquid two phase flow which enters the shell 50 circles around and spirally sinks inside the shell 50. As a result of this circling motion, a cyclone effect is generated wherein the oil mist (fine particles of the refrigerating machine oil) is subjected to centrifugal forces and collides with, and adheres to, the inner surface of the shell 50, so that the oil mist suspended in the refrigerant gas is gradually separated out. Following separation of the oil mist, the refrigerant gas flows out of the outlet pipe 51, and the refrigerating machine oil adhering to the inner surface of the shell 50 flows down the inner surface of the shell 50 under the effects of gravity, is discharged from the discharge pipe 52, flows through the oil return circuit 9 via the capillary tube 8, and is then returned to the compressor 2 via the accumulator 6.

Experiments revealed quite clearly that the oil separation efficiency of the refrigerating machine oil using this type of oil separator varied depending on the position of the outlet pipe 51 inside the shell 50, namely the relationship among the distance L1 between the tip 51a of the outlet pipe 51 and the center of the tip of the inlet pipe 53 inside the shell 50, the distance L2 between the tip 51a of the outlet pipe 51 and the lower opening 50a of the shell 50, and the diameter D of the inlet pipe 53.

Figure 4:
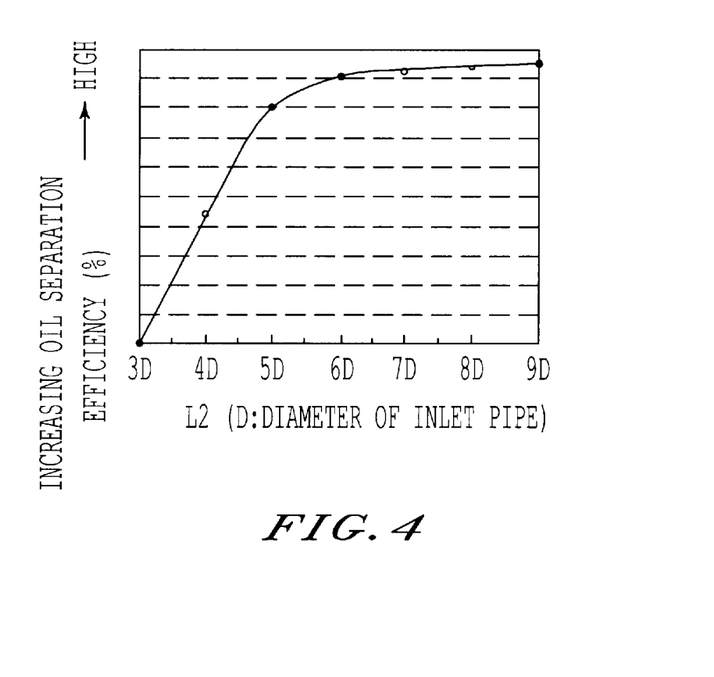
FIG. 4 is a diagram showing the relationship between L2 and the oil separation efficiency.

FIG. 4 is a diagram showing the relationship between L2 and the oil separation efficiency based on experimental results.

These experiments were conducted, assuming a large oil flow rate through the oil separator, under conditions including a refrigerant flow rate of 650 to 680 kg/h, an oil circulation ratio of 2.4 to 2.6%, and an inlet pipe diameter (inside diameter) D of 19.8 mm. The oil flow rate is the product of the refrigerant flow rate and the oil circulation ratio.

In FIG. 4, a tendency can be seen for the oil separation efficiency to increase in accordance with increasing values of L2, although the degree of this increase in the separation efficiency reduces at L2 values of approximately 5D, and at values greater than 5D the oil separation efficiency substantially levels off.

The reason why the oil separation efficiency is poor with the short distance L2 is described below.

Figure 5:
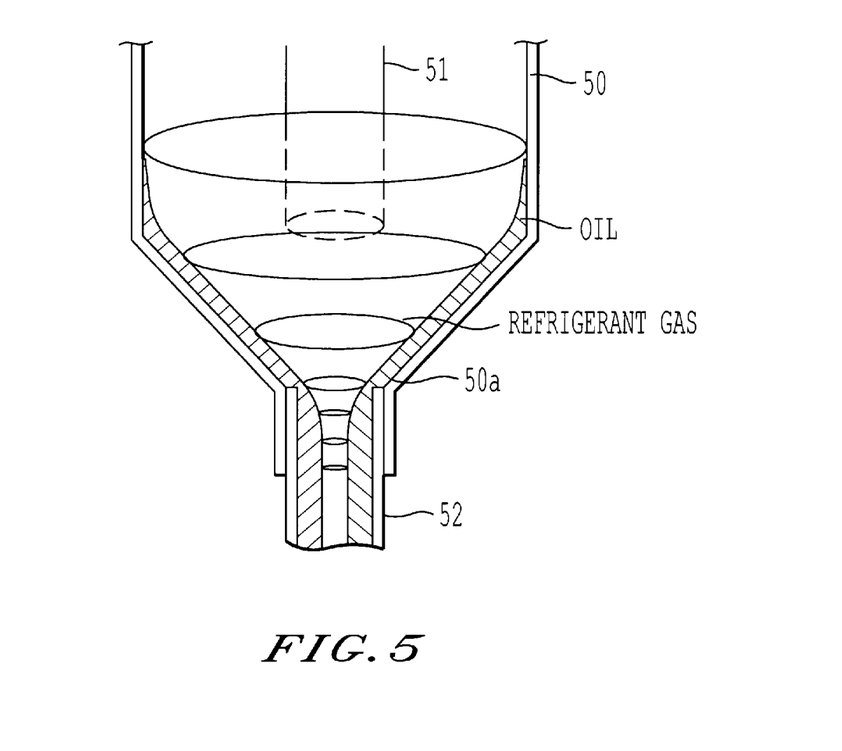
FIG. 5 is a diagram showing the state of a gas liquid two phase flow in an oil separator.

Namely, if the oil flow rate is large, and the distance between the tip 51a of the portion of the outlet pipe 51 inside the shell 50 and the bottom of the shell 50 is small, then the gas currents revolving in a spiral motion cause a rotating liquid film in the shape of a mortar to accumulate on the inner surface of the shell 50, as shown in FIG. 5, so that when separated oil is discharged from the discharge pipe 52, gas is also dragged in from the center, and a gas-liquid two phase flow flows out of the discharge pipe 52. Consequently, the oil flowing into the oil return circuit 9 incorporates gas, so that the pressure loss in the oil return circuit 9 increases and the return oil quantity cannot be ensured sufficiently. As a result, the thickness of the oil film adhering to the inner surface of the shell 50 increases further, and at the bottom of the shell 50, liquid droplets will break away from the thick oil film again, resulting in a reduction in the oil separation efficiency.

At this point, the oil flow rate can be increased by reducing the flow passage resistance in the capillary tube 8 in the oil return circuit. In such a case, however, if the inflow of oil into the oil separator 3 reduces, the bypass volume of hot gas of the refrigerant will increase, and the performance of the refrigerating cycle will decline, so that using this method as means for increasing the oil separation efficiency is problematic.

Figure 6:
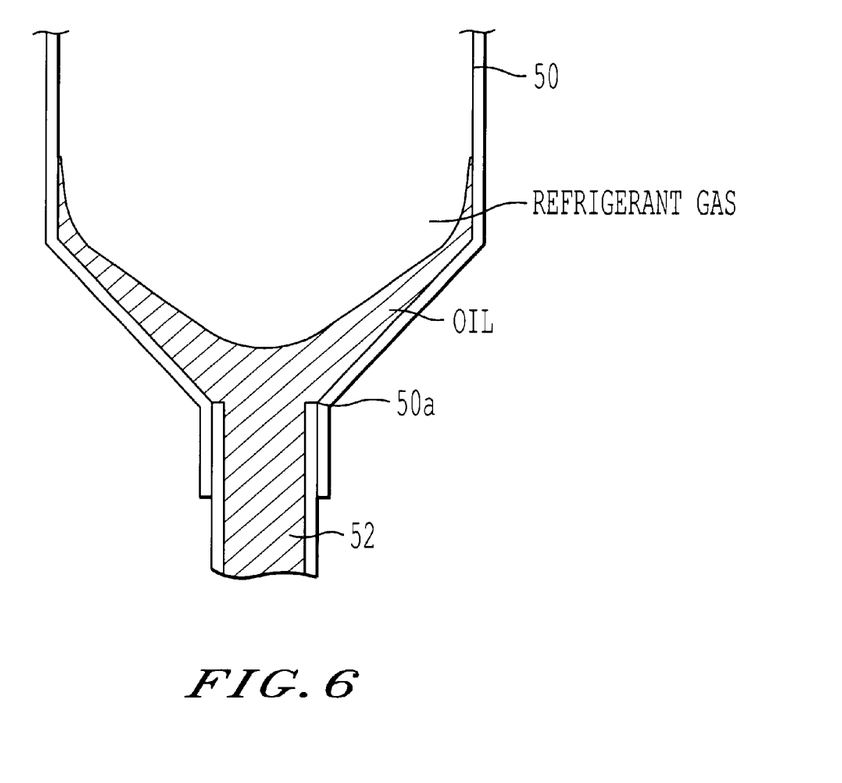
FIG. 6 is a diagram showing the state of a gas liquid two phase flow in an oil separator.

In contrast, if the distance L2 between the tip 51a of the outlet pipe 51 inside the shell 50 and the lower opening 50a of the shell 50 is at least 5D, then the liquid film at the bottom of the shell 50 is unlikely to be affected by the rotation of gas currents in a spiral motion within the shell 50, and as shown in FIG. 6, when the separated oil is discharged from the discharge pipe 52, gas from the central region is not dragged down with the oil, so that the oil is discharged as a single phase from the discharge pipe 52. As a result, pressure loss in the oil return circuit 9 can be suppressed, and the separated oil can be discharged smoothly.

In this manner, by ensuring that the distance between the tip 51a of the outlet pipe 51 inside the shell 50 and the lower opening 50a of the shell 50 is at least 5D, pressure loss within the oil return circuit 9 can be suppressed, and a smooth discharge of the separated oil becomes possible. Accordingly, by reducing the amount of accumulated oil inside the shell 50, and preventing any possibility of liquid droplets scattered again in the lower sections of the shell 50, the oil separation efficiency can be improved.

Figure 7:
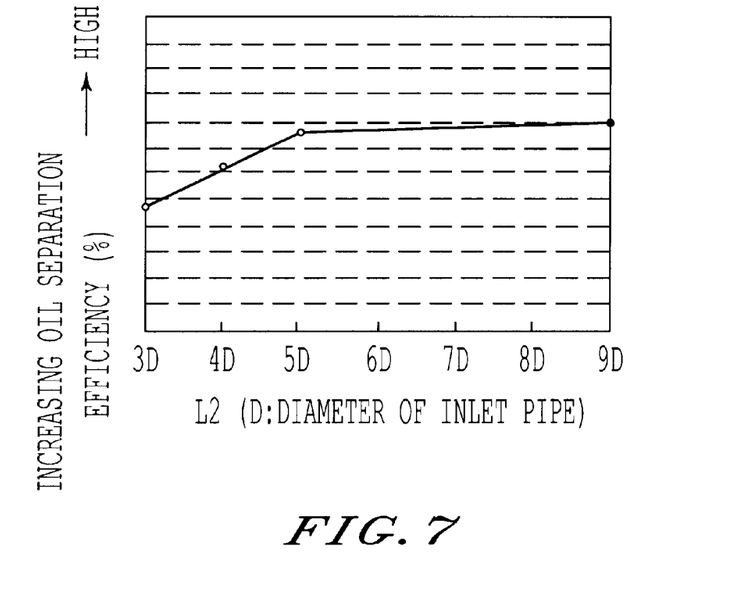
FIG. 7 is a diagram showing the relationship between L1 and the oil separation efficiency.

FIG. 7 is a diagram showing the relationship between L1 and the oil separation efficiency based on experimental results.

These experiments were conducted under conditions including a refrigerant flow rate of 400 kg/h, an oil circulation ratio of 0.5%, and an inlet pipe diameter (inside diameter) D of 19.8 mm.

In FIG. 7, a tendency can be seen for the oil separation efficiency to increase in accordance with increasing values of L1, although the degree of this increase in the separation efficiency reduces at L1 values of approximately 5D, and at values greater than 5D the oil separation efficiency substantially levels off.

The reason why the oil separation efficiency is poor with the short distance L1 is described below.

Generally, in a cyclone type oil separator, if the velocity of the gas flowing into the oil separator is reduced, the velocity of the circling motion within the shell 50 reduces consequently, and liquid droplets will hardly collide with the inner surface of the shell 50 due to centrifugal forces, so that the liquid droplets remain swept up in the circling gas and are discharged together with the gas, resulting in a reduction in the oil separation efficiency. In the case of the oil separator incorporated in a refrigerating cycle, because the flow rate varies depending both on variations in the operational state of the refrigerating cycle in accordance with variations in the loading conditions and on control of the capacity of the variable flow type compressor, the oil separation efficiency falls in the case where the refrigerant flow rate is small. The oil separation efficiency is dependent on the number of circulation made by the gas flow circling around inside the shell 50. Therefore, in order to increase the number of such circulation, the distance between the tip of the inlet pipe 53 inside the shell and the tip of the outlet pipe 51 should be maintained. This factor is reflected in FIG. 7, wherein by separating the positions of the lower tip of the outlet pipe 51 and the tip of the inlet pipe 53 inside the shell by a distance of at least 5D, the oil separation efficiency improves.

Accordingly, by separating the positions of the tips of the outlet pipe 51 and the inlet pipe 53 inside the shell by a distance of at least 5D, the number of circulation of the gas flow inside the shell 50 necessary for oil separation can be ensured, even in the case where the refrigerant flow rate falls, so that the oil separation efficiency improves.

In addition, it is known that the gas liquid two phase flow of the refrigerant gas and the refrigerating machine oil inside the inlet pipe 53 is affected by bends in the piping, which can cause variations in the oil separation efficiency.

Figure 8:
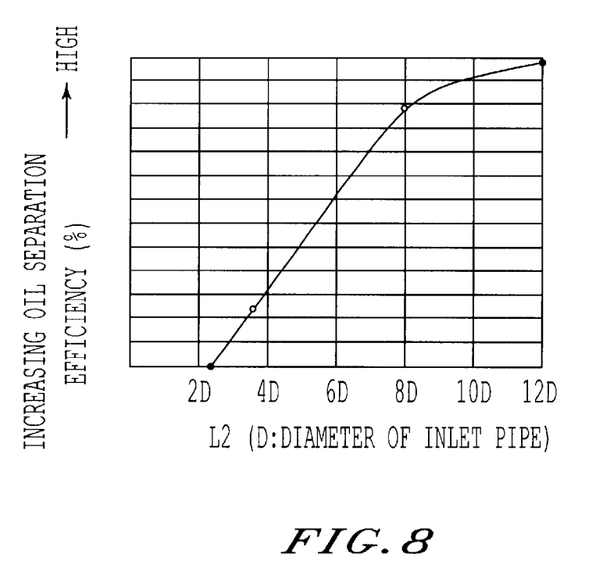
FIG. 8 is a diagram showing the relationship between L3 and the oil separation efficiency.

FIG. 8 is a diagram showing the relationship between the length L3 of the straight pipe section from the tip of the inlet pipe 53 inside the shell 50 and the oil separation efficiency, based on experimental results.

These experiments were conducted under conditions including a refrigerant flow rate of 400 kg/h, an oil circulation ratio of 0.5%, and an inlet pipe diameter (inside diameter) D of 19.8 mm.

In FIG. 8, a tendency can be seen for the oil separation efficiency to increase in accordance with increasing values of the length L3 of the straight pipe section, although the degree of this increase in the separation efficiency reduces at L3 values of approximately 8D, and at values greater than 8D the oil separation efficiency substantially levels off.

The reason why the oil separation efficiency is poor with the short distance L3 is described below.

Namely, if the length L3 of the straight pipe section is short, then a bias develops in the liquid distribution across a passage cross-section of the inlet pipe 53. Accordingly, if the straight pipe section is longer, this bias in the liquid distribution diminishes, and at lengths greater than 8D the flow form of the gas liquid two phase flow stabilizes, and the oil separation efficiency improves.

Figure 9:
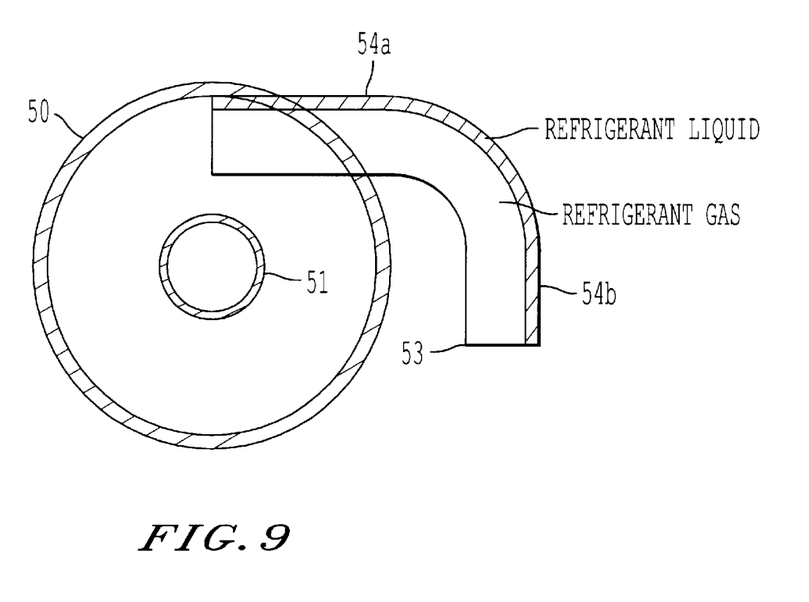
FIG. 9 is a top cross-sectional view of an oil separator.

If the straight pipe section of the inlet pipe 53 cannot be set to a value of at least 8 times the diameter of the inlet pipe 53 because of space restriction, a construction as shown in FIG. 9 can be used, wherein the inlet pipe 53 is bent at approximately 90° in the horizontal plane so as to roughly match the circumferential direction of the shell 50, forming a first straight pipe section 54a and a second straight pipe section 54b.

In such a construction, with a gas liquid two phase flow of refrigerating machine oil and refrigerant gas flowing through the inlet pipe 53, the refrigerating machine oil inclines to flow around the outer periphery of the bent section between the second straight pipe section 54b and the first straight pipe section 54a, and the refrigerating machine oil flows smoothly along the inner surface of the shell 50 when entering the shell 50, so that the separation from the refrigerant gas is smoothly carried out to improve the oil separation efficiency.

Figure 10:
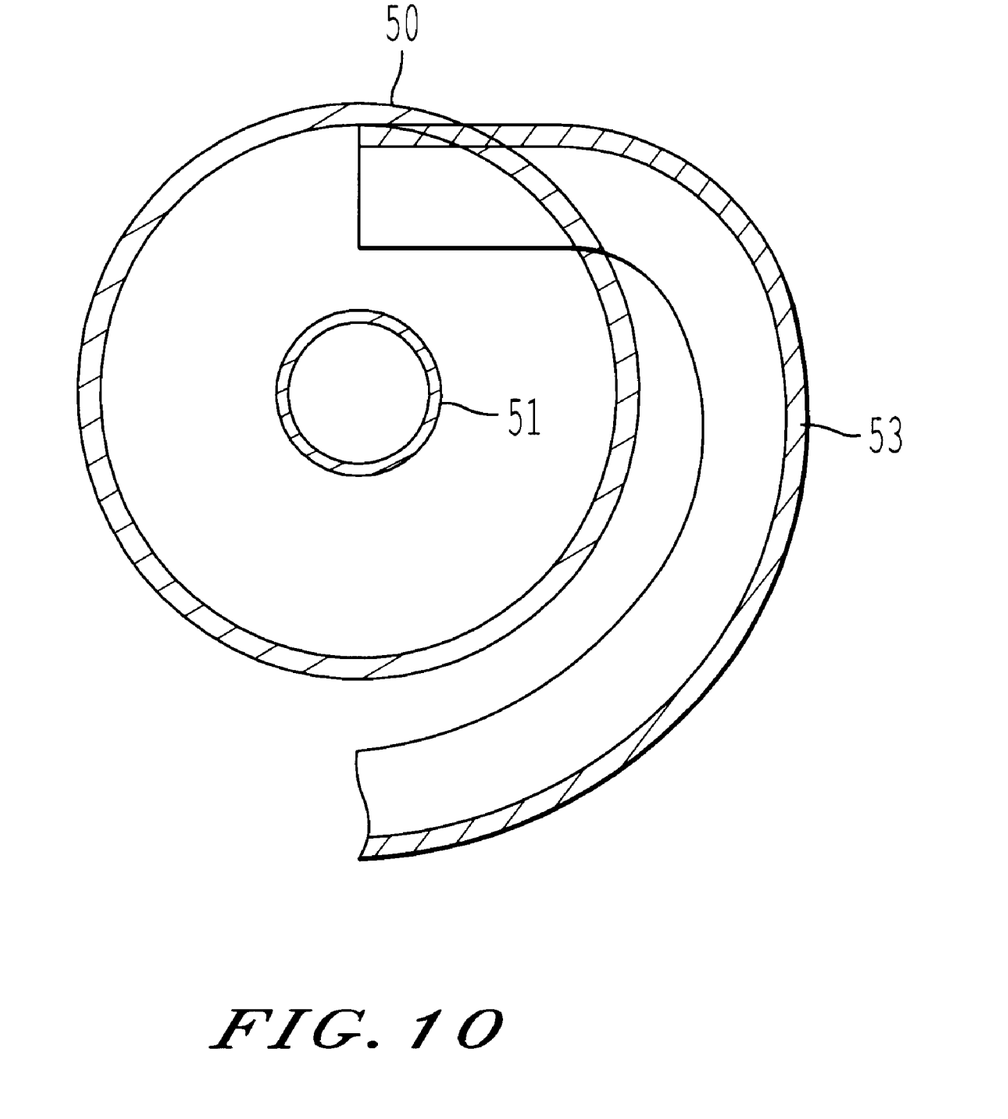
FIG. 10 is a top cross-sectional view of an oil separator.

Furthermore, as shown in FIG. 10, the inlet pipe 53 may be a spiral which is formed around the periphery of the shell 50 coaxially with the shell 50.

In such a construction, the refrigerating machine oil also inclines to flow around the outer periphery of the inlet pipe 53, so that the oil separation efficiency improves.

In this embodiment, by forming not only the lower section, but also the upper section of the oil separator 3 into a taper shape, the number of components can be reduced, and the thickness required to achieve the necessary strength can also be reduced, in comparison with a case that the top is formed as a flat lid, so that the apparatus can be lightened.

Embodiment 2.

Figure 11:
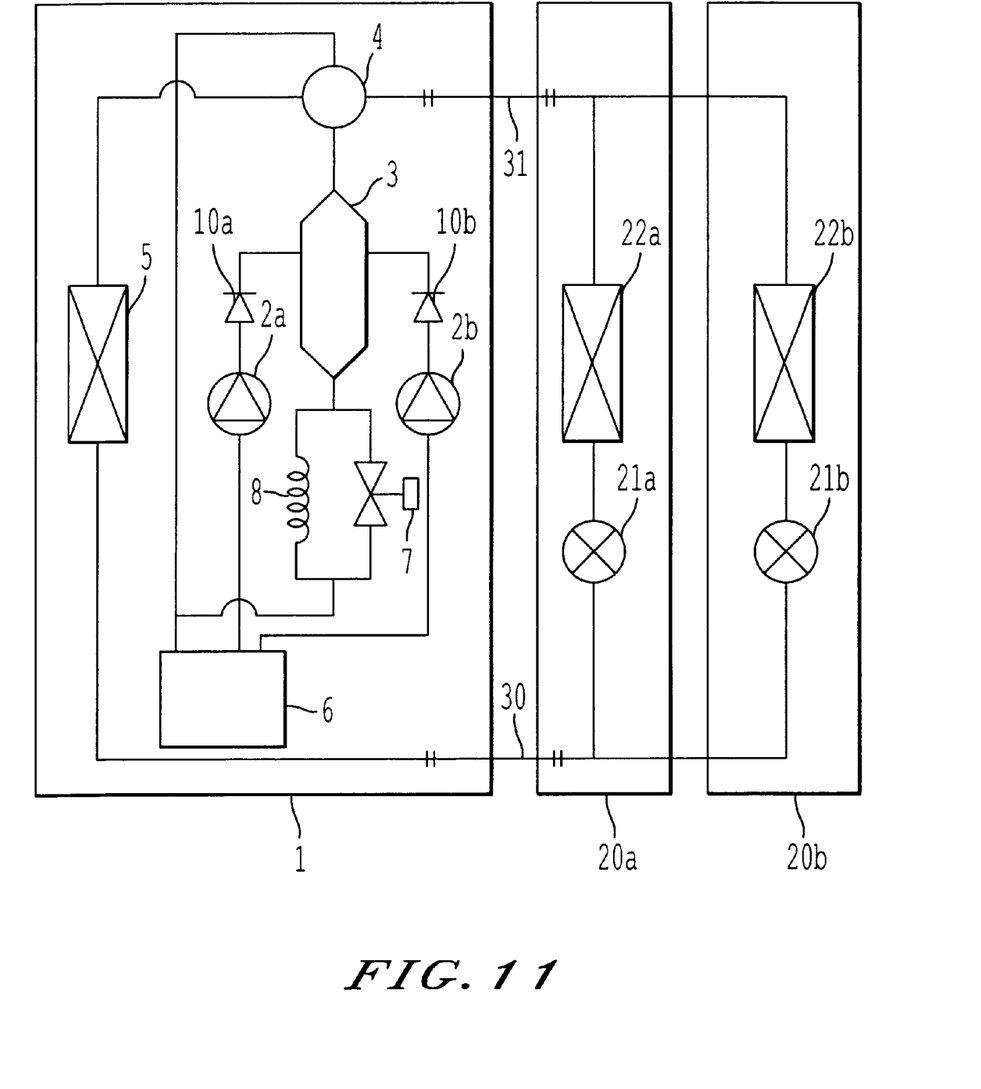
FIG. 11 is a refrigerant circuit diagram of a refrigerating cycle according to an Embodiment 2 of the present invention.

FIG. 11 is a refrigerant circuit diagram showing a refrigerating cycle according to an Embodiment 2 of the present invention, and represents the refrigerant cycle of FIG. 1 wherein two compressors are provided in the outdoor apparatus, and these two compressors are connected to an oil separator. In FIG. 11, those components which are the same as, or correspond with components in FIG. 1 are labeled with the same symbols, and their description here is omitted.

In FIG. 11, 2a and 2b represent compressors, and each of these compressors is connected to the oil separator 3, via a check valve 10a and a check valve 10b respectively.

Next is a description of the operation of the refrigerating cycle of FIG. 11.

As there will be a case where liquid refrigerant is sitting in the compressor 2a and the compressor 2b at the start of the refrigerating cycle, the electromagnetic valve 7 is opened to return the mixed liquid of refrigerant liquid and oil from the oil separator 3 to the inlet of the accumulator 6. As a result, any possibility of the oil separator 3 overflowing and oil being carried outside the outdoor apparatus system is prevented. Furthermore, by starting the compressor 2a and the compressor 2b one by one with a time lag therebetween, the effect of preventing the overflow of the oil separator 3 is enhanced.

Furthermore, when the refrigerating cycle enters steady-state operation, the electromagnetic valve 7 is closed. Oil carried out of the compressor 2a and/or the compressor 2b along with the refrigerant gas is separated out in the oil separator 3, reduced to a low pressure by the capillary tube 8, sent into the oil return circuit 9, and subsequently returned to the compressor 2a and/or the compressor 2b via the accumulator 6.

Capacity control of the compressor 2a and the compressor 2b is conducted in accordance with the load, by suitable starting and stopping of the compressors or by suitable adjustment of the operating frequency of the compressors.

Next is a description of the structural details of the oil separator 3.

Figure 12:
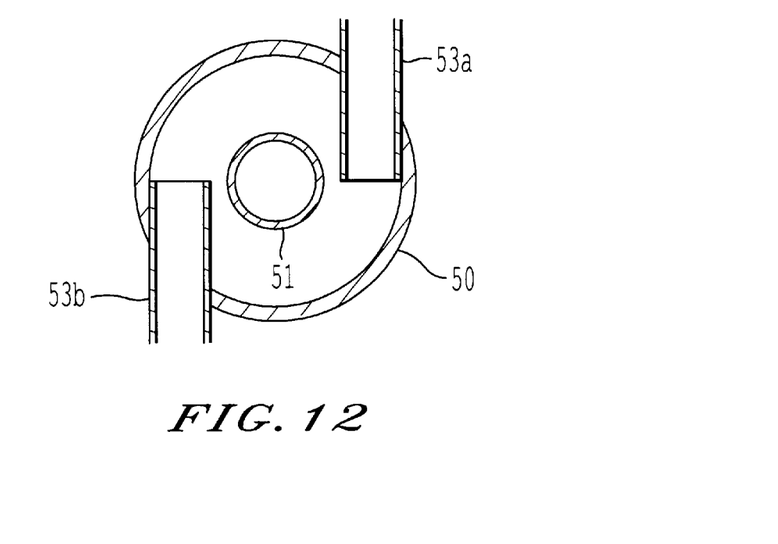
FIG. 12 is a top cross-sectional view of an oil separator according to the Embodiment 2 of the present invention.
Figure 13:
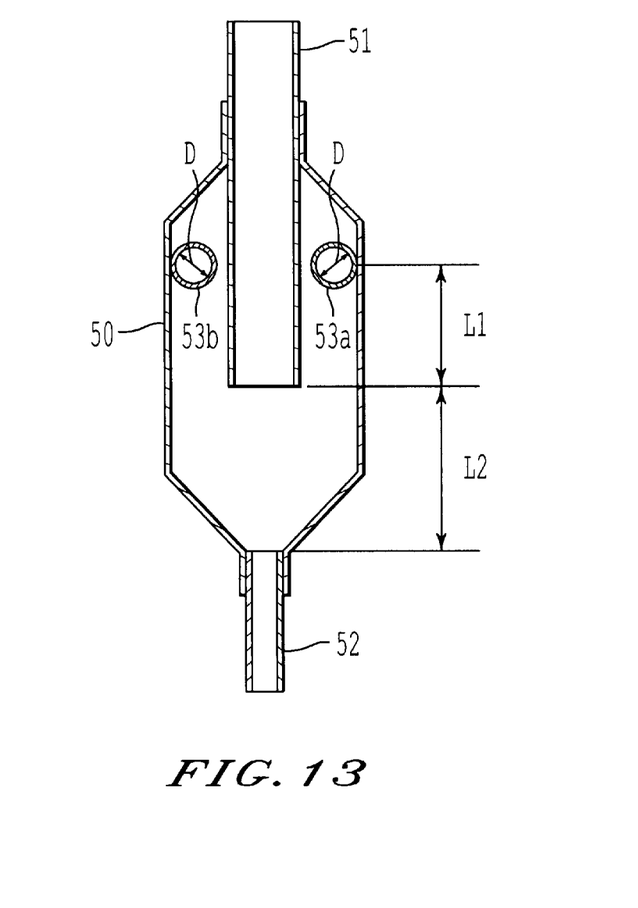
FIG. 13 is a side cross-sectional view of the oil separator according to the Embodiment 2 of the present invention.

FIG. 12 is a top cross-sectional view of the oil separator 3, and FIG. 13 is a side cross-sectional view of the oil separator 3.

In FIG. 12 and FIG. 13, 50 represents a shell of a cylindrical shape with both ends narrowed to taper sections. 51 represents a cylindrical outlet pipe, which passes through the apex of the upper taper section of the shell 50 and into the inside of the shell 50, and this outlet pipe 51 is fixed so that the central axes of the outlet pipe 51 and the shell 50 coincide. 52 represents a discharge pipe, which is fixed to a lower opening 50a formed at the apex of the lower taper section of the shell 50. 53a and 53b represent inlet pipes, which are cylindrical shaped pipes with a diameter D, positioned at the same vertical height on opposing sides relative to the central axis of the shell 50, and connected in a tangential direction to the inner surface of the shell 50. The tip 51a of the portion of the outlet pipe 51 inserted inside the shell 50 is positioned a distance L1 below the center of the tips of the inlet pipes 53a, 53b inside the shell 50, and a distance L2 above the lower opening 50a of the shell 50.

Next is a description of the phenomena which occur in an oil separator of this type of construction.

A gas liquid two phase flow of refrigerant gas and refrigerating machine oil discharged from the compressor 2a and/or the compressor 2b flows into the shell 50 from the inlet pipe 53a and/or the inlet pipe 53b. While the gas-liquid two phase flow which enters the shell 50 circles around and spirally sinks inside the shell 50, the oil mist is subjected to centrifugal forces and collides with, and adheres to, the inner surface of the shell 50, so that the oil mist suspended within the refrigerant gas is gradually separated from the refrigerant gas by the so-called cyclone effect. Following separation of the refrigerating machine oil, the refrigerant gas flows out of the outlet pipe 51, and the refrigerating machine oil adhering to the inner surface of the shell 50 flows down the inner surface of the shell 50 under the effects of gravity and is discharged from the discharge pipe 52.

The pressure loss of the oil separator 3 is dependent on the diameter of the inlet pipes. Therefore, if only one inlet pipe is used and the diameter of that pipe is excessively increased in order to reduce the pressure loss at the time when refrigerant is flowing from two operating compressors, the oil separation efficiency declines due to a reduction in the centrifugal separation effect at the time when only one compressor is operated and the flow rate drops. Consequently, by providing one inlet pipe for each compressor, pressure loss can be reduced, and any reduction in oil separation efficiency can be prevented at the time when only one compressor is operational. Furthermore, in a system with two compressors, the reliability of the refrigerating cycle can be improved at low cost by separating the oil carried out of the compressors with a single oil separator, and preventing depletion of the lubricant in the compressors.

Furthermore, by positioning the inlet pipe 53a and the inlet pipe 53b at the same vertical position within the shell 50 with an equal spacing between the pipes around the inner surface, the trajectory of the refrigerant gas entering from one inlet pipe will not interfere with that from the other inlet pipe, so that gas flow turbulence within the shell 50 can be suppressed, and any reduction in oil separation efficiency during operation of the two compressors can be prevented.

In this embodiment, a description was provided for the case of two inlet pipes, but even in the case of three or more inlet pipes, the same effects can be achieved by positioning the inlet pipes at the same vertical position (the same height) within the shell, with an equal spacing between the pipes around the inner surface. Furthermore, the diameter of each of these plurality of inlet pipes can be altered in accordance with the flow rate of the refrigerant or the capacity of the compressors.

In an oil separator according to the present invention, the distance between the shell opening and the tip of the outlet pipe inside the shell is at least 5 times the inside diameter of the inlet pipe. Therefore, even if the quantity of oil flowing into the oil separator increases, a reduction in the oil separation efficiency can be prevented.

Furthermore, in an oil separator according to the present invention, the tip of the outlet pipe inside the shell is positioned below the center of the inside diameter of the inlet pipe at a distance at least 5 times the inside diameter of the inlet pipe, so that the oil separation efficiency can be maintained at a high level across a wide range of refrigerant circulation flow volumes.

Furthermore, in an oil separator according to the present invention, the inlet pipe has a straight pipe section connected to the cylindrical section of the shell, and the length of this straight pipe section is at least 8 times the inside diameter of the inlet pipe, so that the oil separation efficiency can be increased at low cost even in the case where the gas flow rate is low.

Furthermore, in an oil separator according to the present invention, the inlet pipe is a bent pipe with a first straight pipe section connected to the cylindrical section and a second straight pipe section positioned at a 90 degree angle to the first straight pipe section in the direction of the aforementioned shell, or alternatively, in an oil separator according to the present invention, the inlet pipe is a spiral formed around the central axis of the shell, so that the separation efficiency can be improved even in the case where the installation space is limited.

In addition, the shell comprises a taper section narrowing in a upward direction, which is formed on the top of the aforementioned cylindrical section as an integral part of the cylindrical section. So, in comparison with a case where the top is formed as a flat lid, the number of components can be reduced, and the thickness required to achieve the necessary strength can also be reduced, so that the apparatus can be lightened.

In addition, a plurality of inlet pipes are provided, and these inlet pipes are connected to the cylindrical section at the same vertical position with an equal spacing between pipes. Consequently, pressure loss can be reduced, and any reduction in oil separation efficiency can be prevented when only one compressor is operated. Furthermore, in a system with two compressors, the reliability of the refrigerating cycle can be improved at low cost by separating the oil carried out of the compressors with a single oil separator, and preventing depletion of the lubricant in the compressors. Moreover, the trajectory of the refrigerant gas entering from one inlet pipe will not interfere with that from the other inlet pipe, so that gas flow turbulence within the shell can be suppressed, and any reduction in oil separation efficiency during operation of the two compressors can be prevented.

In addition, an outdoor apparatus according to the present invention comprises a compressor, an oil separator as described above with an inlet pipe connected to the compressor, a capillary tube connected to the discharge pipe of this oil separator, a valve connected to the discharge pipe in a parallel arrangement with the capillary tube, an oil return circuit connected to the capillary tube and the valve, an accumulator connected to the oil return circuit and the compressor, a four way valve connected to the outlet pipe of the oil separator, and a heat exchanger connected to the four way valve, so that the operating efficiency of the apparatus improves.

Furthermore, an outdoor apparatus according to the present invention comprises a plurality of compressors, the aforementioned oil separator with each inlet pipe connected to one of the plurality of compressors, a capillary tube connected to the discharge pipe of the oil separator, a valve connected to the discharge pipe in a parallel arrangement with the capillary tube, an oil return circuit connected to the capillary tube and the valve, an accumulator connected to the oil return circuit and the plurality of compressors, a four way valve connected to the outlet pipe of the aforementioned oil separator, and a heat exchanger connected to the four way valve, so that the operating efficiency of the apparatus improves.

In addition, the valve is opened only during startup of a compressor, so that any overflow of the oil separator can be prevented, even during startup of a compressor when the oil flow rate into the oil separator increases temporarily.

What is claimed is:

1. An oil separator comprising a shell having a cylindrical section and a taper section which narrows in a downward direction and which is formed as an integral part at a bottom of said cylindrical section, an outlet pipe which is inserted through a top of said shell so that a central axis of said outlet pipe coincides with a central axis of said shell, a discharge pipe connected to an opening provided at a bottom of said taper section, and an inlet pipe connected tangentially to an inner surface of said cylindrical section for introducing a gas liquid two phase flow into said shell, characterized in that a distance between said opening and a tip of said outlet pipe inside said shell is at least 5 times an inside diameter of said inlet pipe.

2. The oil separator according to claim 1, wherein said shell comprises a taper section which narrows in an upward direction and which is formed on top of said cylinder section as an integral part of said cylindrical section.

3. The oil separator according to claim 1, wherein, a plurality of said inlet pipes are provided, and said inlet pipes are connected to said cylindrical section at an identical vertical height position and with an equal spacing between said inlet pipes.

4. An outdoor apparatus characterized by comprising a compressor, the oil separator according to claim 1 with an inlet pipe connected to said compressor, a capillary tube connected to a discharge pipe of said oil separator, a valve connected to said discharge pipe in a parallel arrangement with said capillary tube, an oil return circuit connected to said capillary tube and said valve, an accumulator connected to said oil return circuit and said compressor, a four way valve connected to an outlet pipe of said oil separator, and a heat exchanger connected to said four way valve.

5. An outdoor apparatus characterized by comprising a plurality of compressors, the oil separator according to claim 3 with each inlet pipe connected to one of said plurality of compressors, a capillary tube connected to the discharge pipe of said oil separator, a valve connected to said discharge pipe in a parallel arrangement with said capillary tube, an oil return circuit connected to said capillary tube and said valve, an accumulator connected to said oil return circuit and said plurality of compressors, a four way valve connected to an outlet pipe of said oil separator, and a heat exchanger connected to said four way valve.

6. An outdoor apparatus according to claim 4, characterized in that said valve is opened only during startup of said compressor.

7. An oil separator comprising a shell having a cylindrical section and a taper section which narrows in a downward direction and which is formed as an integral part at a bottom of said cylindrical section, an outlet pipe which is inserted through a top of said shell so that a central axis of said outlet pipe coincides with a central axis of said shell, a discharge pipe connected to an opening provided at a bottom of said taper section, and an inlet pipe connected tangentially to an inner surface of said cylindrical section for introducing a gas liquid two phase flow into said shell, characterized in that a tip of said outlet pipe inside said shell is positioned below a center of an inside diameter of said inlet pipe at a distance at least 5 times said inside diameter of said inlet pipe.

8. The oil separator according to claim 7, wherein said shell comprises a taper section which narrows in an upward direction and which is formed on top of said cylinder section as an integral part of said cylindrical section.

9. The oil separator according to claim 7, wherein, a plurality of said inlet pipes are provided, and said inlet pipes are connected to said cylindrical section at an identical vertical height position and with an equal spacing between said inlet pipes.

10. An outdoor apparatus characterized by comprising a compressor, the oil separator according to claim 7 with an inlet pipe connected to said compressor, a capillary tube connected to a discharge pipe of said oil separator, a valve connected to said discharge pipe in a parallel arrangement with said capillary tube, an oil return circuit connected to said capillary tube and said valve, an accumulator connected to said oil return circuit and said compressor, a four way valve connected to an outlet pipe of said oil separator, and a heat exchanger connected to said four way valve.

11. An oil separator comprising a shell having a cylindrical section and a taper section which narrows in a downward direction and which is formed as an integral part at a bottom of said cylindrical section, an outlet pipe which is inserted through a top of said shell so that a central axis of said outlet pipe coincides with a central axis of said shell, a discharge pipe connected to an opening provided at a bottom of said taper section, and an inlet pipe connected tangentially to an inner surface of said cylindrical section for introducing a gas liquid two phase flow into said shell, characterized in that said inlet pipe has a straight pipe section connected to said cylindrical section, and a length of said straight pipe section is at least 8 times an inside diameter of said inlet pipe.

12. The oil separator according to claim 11, wherein said shell comprises a taper section which narrows in an upward direction and which is formed on top of said cylinder section as an integral part of said cylindrical section.

13. The oil separator according to claim 11, wherein, a plurality of said inlet pipes are provided, and said inlet pipes are connected to said cylindrical section at an identical vertical height position and with an equal spacing between said inlet pipes.

14. An outdoor apparatus characterized by comprising a compressor, the oil separator according to claim 11 with an inlet pipe connected to said compressor, a capillary tube connected to a discharge pipe of said oil separator, a valve connected to said discharge pipe in a parallel arrangement with said capillary tube, an oil return circuit connected to said capillary tube and said valve, an accumulator connected to said oil return circuit and said compressor, a four way valve connected to an outlet pipe of said oil separator, and a heat exchanger connected to said four way valve.

* * * * *

UNITED STATES PATENT AND TRADEMARK OFFICE
CERTIFICATE OF CORRECTION

PATENT NO. : 6,574,986 B2  Page 1 of 1
DATED : June 10, 2003
INVENTOR(S) : Morimoto et al.

It is certified that error appears in the above-identified patent and that said Letters Patent is hereby corrected as shown below:

<u>Title page,</u>
Item [30], Foreign Application Priority Data, should read
-- [30] Foreign Application Priority Data,
Aug. 21, 2000 (JP) ………………..2000-249903 --

Signed and Sealed this

Twenty-third Day of September, 2003

JAMES E. ROGAN
*Director of the United States Patent and Trademark Office*